US012670550B2

(12) United States Patent
Jiang et al.

(10) Patent No.: US 12,670,550 B2
(45) Date of Patent: Jun. 30, 2026

(54) IMAGE PROCESSING METHOD, APPARATUS AND DEVICE

(71) Applicant: Suzhou MetaBrain Intelligent Technology Co., Ltd., Suzhou (CN)

(72) Inventors: Dongdong Jiang, Suzhou (CN); Gang Dong, Suzhou (CN); Yaqian Zhao, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 290 days.

(21) Appl. No.: 18/564,341

(22) PCT Filed: Jan. 26, 2022

(86) PCT No.: PCT/CN2022/074064
§ 371 (c)(1),
(2) Date: Nov. 27, 2023

(87) PCT Pub. No.: WO2023/045197
PCT Pub. Date: Mar. 30, 2023

(65) Prior Publication Data
US 2024/0265496 A1 Aug. 8, 2024

(30) Foreign Application Priority Data

Sep. 23, 2021 (CN) .......................... 202111114230.7

(51) Int. Cl.
*G06T 5/20* (2006.01)
*G06T 5/50* (2006.01)
*G06T 7/11* (2017.01)
(52) U.S. Cl.
CPC .................. *G06T 5/20* (2013.01); *G06T 5/50* (2013.01); *G06T 7/11* (2017.01); *G06T 2207/20221* (2013.01)

(58) Field of Classification Search
CPC ..... G06T 5/20; G06T 5/50; G06T 7/11; G06T 2207/20221; G06T 1/20; G06T 7/10;
(Continued)

(56) References Cited

U.S. PATENT DOCUMENTS

2012/0044991 A1* 2/2012 Mochizuki ............. H04N 19/86
375/E7.243
2016/0139992 A1* 5/2016 Lumb ................... G06F 3/0623
714/15
(Continued)

FOREIGN PATENT DOCUMENTS

CN 103493039 A 1/2014
CN 104760550 A 7/2015
(Continued)

OTHER PUBLICATIONS

International Search Report dated May 26, 2022, International Appl. No. PCT/CN2022/074064.
(Continued)

*Primary Examiner* — Mekonen T Bekele
(74) *Attorney, Agent, or Firm* — Maschoff Brennan

(57) ABSTRACT

The image processing apparatus comprises at least a first arithmetic unit and a second arithmetic unit. The first arithmetic unit and the second arithmetic unit are cascaded by means of a serial transceiver, and are configured to execute the image processing method in parallel. The image processing method comprises: acquiring sub-images obtained by segmenting an original image by an external processor, and using the sub-images as current-level result images; extracting current-level image elements in the current-level result images according to a specified convolution kernel and the segmentation mode in which the sub-images are obtained; sending the current-level image elements to a front-level arithmetic unit, and receiving a back-level image elements sent by a back-level arithmetic unit; synthesizing
(Continued)

the current-level result images and the back-level image elements into current-level images to be processed; and performing convolution operation on said current-level images to obtain the current-level result images.

19 Claims, 6 Drawing Sheets

(58) Field of Classification Search
CPC .... G06T 1/60; G06T 5/70; G06T 7/62; G06T 2207/20081; G06N 3/0464; G06N 3/08
See application file for complete search history.

(56) References Cited

U.S. PATENT DOCUMENTS

| | | | | |
|---|---|---|---|---|
| 2018/0199047 A1* | 7/2018 | Hook | .................... | H04N 7/01 |
| 2018/0220052 A1* | 8/2018 | Granneman | .......... | H04N 23/10 |
| 2019/0197656 A1 | 6/2019 | Yoda | | |
| 2019/0206022 A1 | 7/2019 | Katayama | | |
| 2020/0160111 A1 | 5/2020 | Ling | | |

FOREIGN PATENT DOCUMENTS

| | | | | | |
|---|---|---|---|---|---|
| CN | 105243399 A | | 1/2016 | | |
| CN | 107704923 A | | 2/2018 | | |
| CN | 110196053 A | | 9/2019 | | |
| CN | 110490876 A | * | 11/2019 | .............. | G06T 7/10 |
| CN | 110516799 A | | 11/2019 | | |
| CN | 110555847 A | | 12/2019 | | |
| CN | 111507950 A | | 8/2020 | | |
| CN | 111738276 A | | 10/2020 | | |
| CN | 111898081 A | | 11/2020 | | |
| CN | 111931877 A | | 11/2020 | | |
| CN | 112995491 A | | 6/2021 | | |
| CN | 113570612 A | | 10/2021 | | |

OTHER PUBLICATIONS

Written Opinion dated May 23, 2022; International Appl. No. PCT/CN2022/074064.
First Office Action of corresponding Chinese application No. 2021111142307.

* cited by examiner

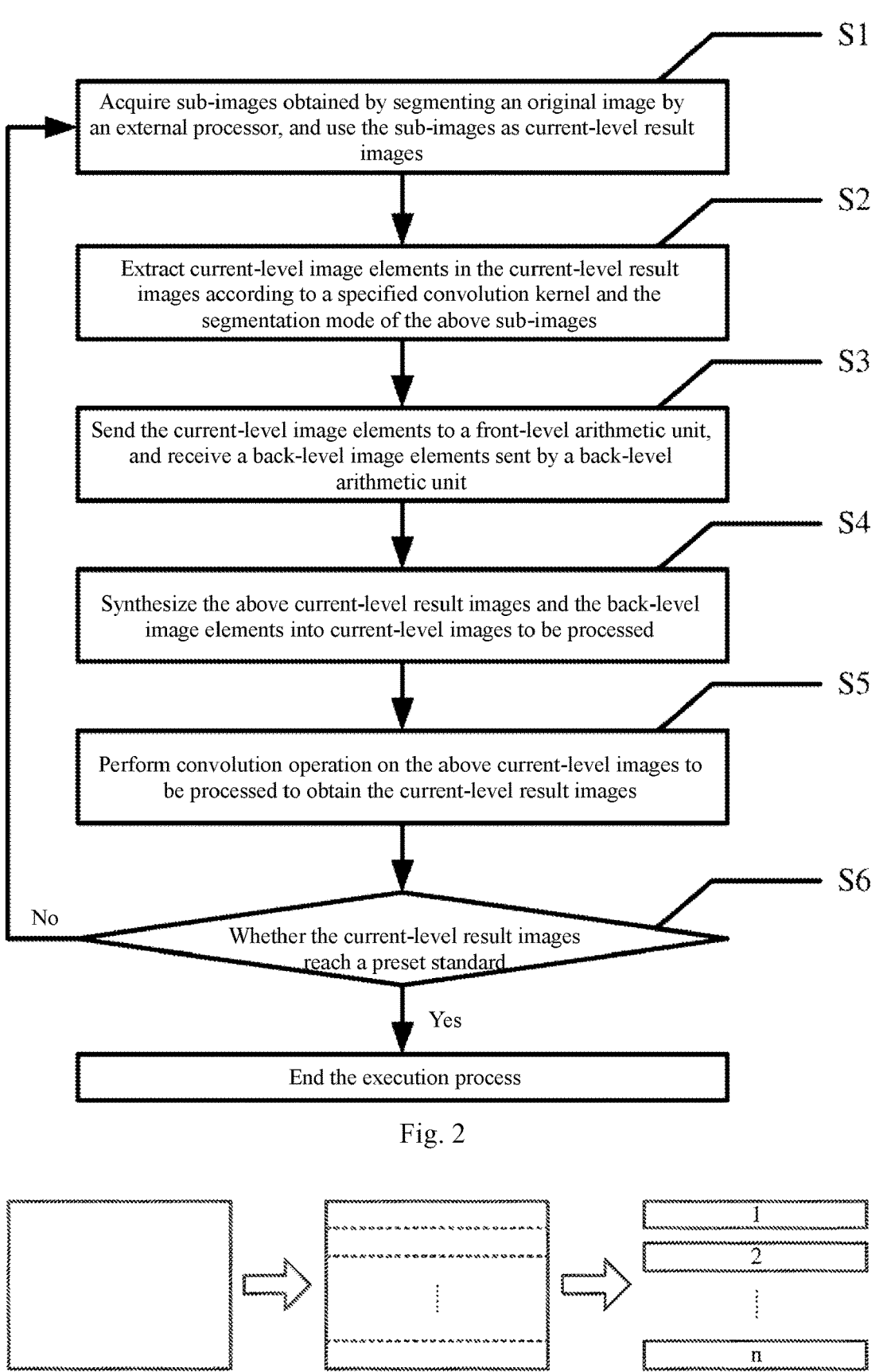

S1

Acquire sub-images obtained by segmenting an original image by an external processor, and use the sub-images as current-level result images

S2

Extract current-level image elements in the current-level result images according to a specified convolution kernel and the segmentation mode of the above sub-images

S3

Send the current-level image elements to a front-level arithmetic unit, and receive a back-level image elements sent by a back-level arithmetic unit

S4

Synthesize the above current-level result images and the back-level image elements into current-level images to be processed

S5

Perform convolution operation on the above current-level images to be processed to obtain the current-level result images

S6

No

Whether the current-level result images reach a preset standard

Yes

End the execution process

Convolution
kernel

N

M

N-1 stripes

Sub-image

Image element

Cutting line

First
arithmetic unit

111

Serial transceiver

112

Second
arithmetic unit

IMAGE PROCESSING METHOD, APPARATUS AND DEVICE

CROSS REFERENCE TO RELATED APPLICATIONS

The present application is the U.S. National stage of PCT/CN2022/074064 filed on Jan. 26, 2022, which claims the priority of Chinese patent application filed with the Chinese Patent Office on Sep. 23, 2021, with an application number of 202111114230.7 and entitled "Image Processing Method, Apparatus and Device", the contents of which are incorporated herein by reference in its entirety.

TECHNICAL FIELD

The present application relates to the field of deep learning, in particular to an image processing method, apparatus and device.

BACKGROUND ART

The emergence of deep learning algorithm greatly promotes development of machine learning and deep learning algorithm is widely used in the fields of image, voice and natural language processing. Depending on the improvement of convolutional neural networks (CNNs) model and the improvement of hardware calculation ability, the deep learning algorithm can be fitted by means of more training data, to improve the accuracy of task processing. Thanks to the application of deep learning technology, image recognition products have been widely used in daily work and life, thereby providing strong technical support for orderly operation of society.

In an early stage of image processing application, limited by an image acquisition technology, the amount of image data needed to be processed is often limited, and an internal memory of an arithmetic unit can complete an image processing task. However, with a gradual increase in image information, the amount of data has greatly exceeded the capacity of the memory of a calculation unit. In view of this situation, technicians can choose an external memory solution: that is, a memory can be extended outside the calculation unit, results of each convolution calculation are cached into the external extended memory, and then results are read out for the next round of calculation; a solution of upgrading an arithmetic unit can also be chosen: that is, the arithmetic unit is replaced with an arithmetic unit having a high-capacity internal memory, and a single arithmetic unit still continues to be used. The inventor realized that for the former solution, the external memory can reduce the reading and writing speed in a calculation process, thereby dramatically reducing the calculation speed, and even forcing a calculation unit to adopt serial calculation due to a large amount of data, and further deteriorating the calculation performance; for the latter solution, the improvement of hardware performance of the arithmetic unit will lead to a sharp increase in cost: the internal memory capacity will be doubled, the price may be increased by ten times, and limited by adaptability of the arithmetic unit, the solution may face the problem of frequently replacing with arithmetic units of different models, thereby further increasing the pressure in cost.

SUMMARY OF THE INVENTION

In a first aspect, embodiments of the present application provide an image processing method applied to an arithmetic unit in an image processing apparatus, wherein the image processing apparatus includes at least a first arithmetic unit and a second arithmetic unit, the first arithmetic unit and the second arithmetic unit are cascaded by means of a serial transceiver, the first arithmetic unit and the second arithmetic unit are configured to execute the image processing method in parallel, and the above image processing method includes:

acquiring sub-images obtained by segmenting an original image by an external processor, and using the sub-images as current-level result images;

extracting current-level image elements in the current-level result images according to a specified convolution kernel and a segmentation mode in which the sub-images are obtained; sending the current-level image elements to a front-level arithmetic unit, and receiving back-level image elements sent by a back-level arithmetic unit; and synthesizing the current-level result images and the back-level image elements into current-level images to be processed; and performing convolution operation on said current-level images to be processed to obtain the current-level result images.

In one of the embodiments, when the current-level result images reach a preset standard, the execution process of the image processing method ends; and when the current-level result images fail to reach the preset standard, the execution process of the image processing method is executed iteratively.

In one of the embodiments, the step of acquiring sub-images obtained by segmenting an original image by an external processor includes:

segmenting the original image horizontally in a direction parallel to a width edge of the original image, to obtain the sub-images;

or, segmenting the original image vertically in a direction parallel to a height edge of the original image, to obtain the sub-images.

In one of the embodiments, the convolution kernel has a width N and a height M;

the width N is a positive odd number;

the height M is a positive odd number;

the number of channels of the convolution kernel is the same as the number of channels of the current-level images to be processed; and parameters of the convolution kernel are obtained by pre-training.

In one of the embodiments, the step of extracting current-level image elements in the current-level result images according to a specified convolution kernel and a segmentation mode in which the sub-images are obtained includes:

when the original image is segmented horizontally in a direction parallel to the width edge of the original image, copying M−1 stripes of pixels, adjacent to a boundary of each front-level result image, from the current-level result images as the current-level image elements; and when the original image is segmented vertically in a direction parallel to the height edge of the original image, copying N−1 stripes of pixels, adjacent to a boundary of each front-level result image, from the current-level result images as the current-level image elements.

In one of the embodiments, the step of synthesizing the current-level result images and the back-level image elements into current-level images to be processed includes:

splicing the next-stage image elements in sequence to a boundary connected with each current-level result image; and taking the spliced images as the current-level images to be processed.

In one of the embodiments, the step of performing convolution operation on said current-level images to be processed includes:

setting a uniform step value for a complete convolution operation; and starting the process of convolution operation.

In a second aspect, embodiments of the present application further provide an image processing apparatus, and the image processing apparatus includes:

at least a first arithmetic unit and a second arithmetic unit;

wherein both the first arithmetic unit and the second arithmetic unit are configured to execute the image processing method provided in the above first aspect in parallel;

the first arithmetic unit and the second arithmetic unit are cascaded by means of a serial transceiver;

as a front-level arithmetic unit, the first arithmetic unit is configured to receive image elements;

as a back-level arithmetic unit, the second arithmetic unit is configured to send image elements; and the serial transceiver is configured to take the image elements of the back-level arithmetic unit as back-level image elements and send the back-level image elements to the front-level arithmetic unit.

In one of the embodiments, each arithmetic unit includes:

an internal storage module, configured to store current-level images to be processed and current-level result images; and a convolution arithmetic module, configured to perform convolution operation on the current-level images to be processed that are stored in the internal storage module;

in one of the embodiments, the step of performing convolution operation includes:

performing convolution operation by using a designated convolution kernel and the set step value;

in one of the embodiments, the above designated convolution kernel has a width N and a height M;

wherein the width N is a positive odd number, the height M is a positive odd number; the number of channels of the above convolution kernel is the same as the number of channels of the current-level images to be processed; and parameters of the above convolution kernel are obtained through pre-training.

In one of the embodiments, the step value is a uniform step value set for a complete convolution operation.

An image preprocessing module is configured to extract current-level image elements in the current-level result images, and send to the front-level image preprocessing module by means of the serial transceiver, synthesize the back-level image elements received by the serial transceiver with the current-level result images in the current-level internal storage module to generate current-level images to be processed, and store the current-level images to be processed into the current-level internal storage module;

in one of the embodiments, the step of extracting current-level image elements in the current-level result images according to a specified convolution kernel and a segmentation mode in which the sub-images are obtained includes:

when the original image is segmented horizontally in a direction parallel to the width edge of the original image, copying M−1 stripes of pixels, adjacent to a boundary of each front-level result image, from the current-level result images as the current-level image elements; and when the original image is segmented vertically in a direction parallel to the height edge of the original image, copying N−1 stripes of pixels, adjacent to a boundary of each front-level result image, from the current-level result images as the current-level image elements.

In one of the embodiments, the step of synthesizing the current-level result images and the back-level image elements into current-level images to be processed includes:

splicing the next-stage image elements in sequence to a boundary connected with each current-level result image; and taking the spliced images as the current-level images to be processed.

A serial transceiver is configured to send the current-level image elements to a front-level arithmetic unit.

In one of the embodiments, when the current-level result images reach a preset standard, the arithmetic unit in the image processing apparatus sends the current-level result images to the external processor; and when the current-level result images fail to reach the preset standard, the execution process of the image processing method is executed iteratively.

In one of the embodiments, when the image processing task starts, the image processing apparatus acquires sub-images obtained by segmenting an original image by an external processor, and takes the sub-images as current-level result images and stores in an internal storage module of the arithmetic unit.

In a third aspect, embodiments of the present application provide an image processing electronic device, including a memory and one or more processors, the memory has computer readable instructions stored therein, and the computer readable instructions, when executed by the one or more processors, enable the one or more processors to perform steps of any of the above image processing methods. In a fourth aspect, one or more non-transitory computer readable storage media having computer readable instructions stored therein are provided in embodiments of the present application, and the computer readable instructions, when executed by the one or more processors, enable the one or more processors to perform steps of any of the above image processing methods.

Details of one or more embodiments of the present application are provided in the following accompanying drawings and description. Other characteristics and advantages of the present application will become apparent from the specification, accompanying drawings and claims.

BRIEF DESCRIPTION OF THE DRAWINGS

In order to more clearly illustrate technical solutions of the embodiments of the present application, a brief description will be given below on the accompanying drawings required to be used in the description of the embodiments. Apparently, the accompanying drawings described below are merely some embodiments of the present application, and other drawings may be obtained according to these drawings by those skilled in the art without any creative effort.

FIG. 2 is a flow diagram of an image processing task provided according to one or more embodiments of the present application;

FIG. 3(*a*) is a schematic diagram of an average segmentation of an original image in a horizontal direction provided according to one or more embodiments of the present application;

FIG. 3(*b*) is a schematic diagram of an average segmentation of an original image in a vertical direction provided according to one or more embodiments of the present application;

FIG. 5(*b*) is a schematic diagram of extracting current-level image elements according to sub-images segmented according to a convolution kernel and a vertical manner provided according to one or more embodiments of the present application;

FIG. 6(*b*) is a schematic diagram of a process of synthesizing a next-stage image element from a vertically segmented current-level result image provided according to one or more embodiments of the present application;

DETAILED DESCRIPTION OF THE EMBODIMENTS

Figure 1:
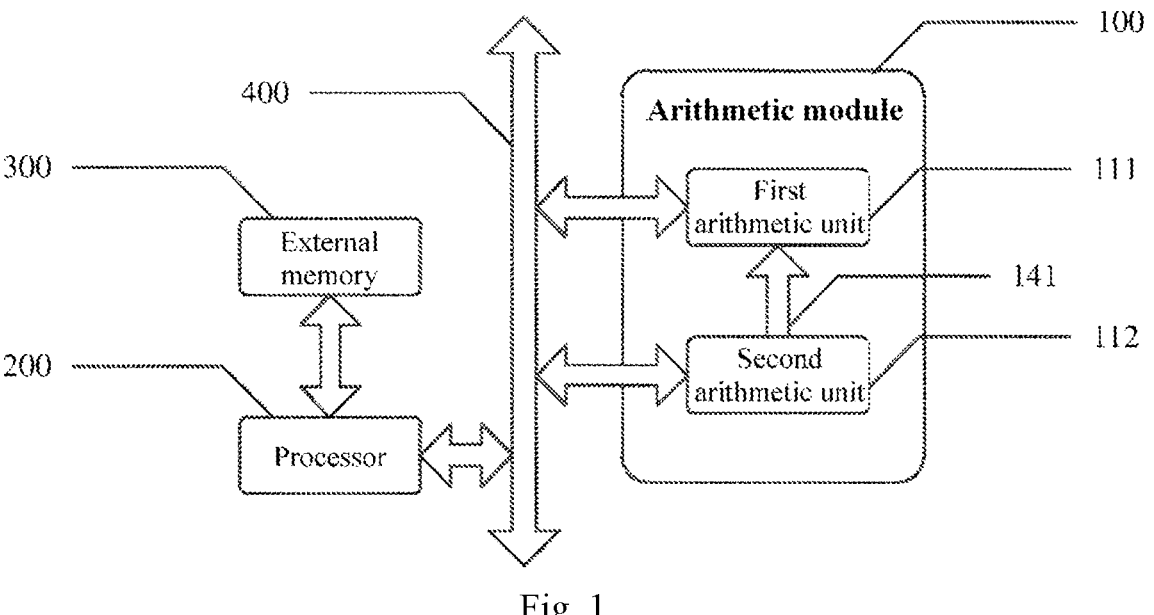
FIG. 1 is a schematic diagram of a hardware architecture for performing image processing tasks according to one or more embodiments of the present application.

In order to make the purpose, technical solutions and advantages of the present application clearer, the technical solutions in the implementation of the present application will be clearly and completely described below in combination with the accompanying drawings in the implementation of the present application. Apparently, the described implementation is merely part but not all of the embodiments of the present application. Based on the embodiments in the present application, all the other embodiments obtained by those skilled in the art without any creative effort shall all fall within the protection scope of the present application.

Unless otherwise defined, the technical terms or scientific terms used in the present disclosure shall have the general meanings understood by those skilled in the art to which the present disclosure belongs. "First", "second" and similar words used in the present disclosure do not indicate any order, quantity or importance, but are merely used to distinguish different components. Likewise, words like "a", "an" or "the" do not denote a limitation of quantity, but mean that there is at least one. The numbers in the drawings of the specification only indicate the distinction of each functional component or module, and do not indicate a logical relationship between the components or modules. "Including" or "include" and similar words mean that the elements or objects appearing before the word include the elements or objects listed after the word and their equivalents, without excluding other elements or objects. Words such as "connection" or "connected" are not limited to physical or mechanical connections, but may include electrical connections, whether direct or indirect connections. "Upper", "lower", "left", "right" and so on are merely used to indicate a relative positional relationship. When an absolute position of the described object changes, the relative positional relationship may also change accordingly.

Hereinafter, various embodiments according to the present disclosure will be described in details with reference to the accompanying drawings. It should be noted that, in the drawings, the same reference numerals are assigned to components having substantially the same or similar structures and functions, and repeated descriptions about them will be omitted.

In one embodiment, the hardware architecture for performing image processing tasks as shown in FIG. 1 includes:

an arithmetic module 100, configured to execute the image processing method disclosed in the present application, and including:

at least a first arithmetic unit 111, a second arithmetic unit 112 and a first transceiver 141, wherein the first arithmetic unit 111 and the second arithmetic unit 112 are respectively in communication connection with a bus 400. The first arithmetic unit 111 and the second arithmetic unit 112 are cascaded in series through the first transceiver 141, and the first arithmetic unit 111 receives image data sent by the second arithmetic unit 112 through the first transceiver 141. For the convenience of description, the relationship between two serially cascaded arithmetic units is defined as follows: the arithmetic unit that receives data through the transceiver is a front-level arithmetic unit, and the arithmetic unit that sends data through the transceiver is a back-level arithmetic unit.

Each arithmetic unit in the above arithmetic module 100 has an independent image processing capability, and a field programmable gate array (abbreviated as FPGA), a central processing unit (abbreviated as CPU), a graphics processing unit (abbreviated as GPU), a neural-network processing unit (abbreviated as NPU), digital signal processing (abbreviated as DSP) and the like can be selected.

The above transceivers select high-speed serial transceivers, including: GT (Gigabyte Transceiver), GTX, GTH, etc.

The external processor 200 is configured to segment the original image and synthesize the images processed by the arithmetic module. A central processing unit (abbreviated as CPU) is selected, and the CPU can adopt an X86 architecture or an ARM architecture.

The external memory 300 is configured to store image files. As one type of dynamic random access memory (abbreviated as DRAM), a synchronous dynamic random access memory (abbreviated as SDRAM) is usually selected as an external memory, and the synchronous dynamic random access memory (SDRAM) can synchronize the working frequency of the external memory with the working frequency of the central processing unit, such that data transmission is in place in real time. As one type of synchronous dynamic random access memory (SDR AM), single data rate SDRAM (abbreviated as SDR SDRAM) can be selected as an external memory; as a preferred situation, double data rate SDRAM (abbreviated as DDR SDRAM) can transmit data on rising and falling edges of clock signals. Compared with single data rate synchronous dynamic random access memory (SDR SDRAM) which can only transmit data on a rising edge, DDRSDRAM is selected to effectively improve system performance.

A bus 400 is configured to exchange data between the arithmetic module 100 and an external processor 200. A peripheral component interconnect express (abbreviated as PCIE) bus is selected.

The external processor 200 is in communication connection with the external memory 300; the external processor 200 is in communication connection with the bus 400; and the bus 400 is in communication connection with each arithmetic unit in the arithmetic module 100.

FIG. 2 shows a flow diagram of an image processing task according to at least one embodiment disclosed in the present application, including:

S1: acquiring sub-images obtained by segmenting an original image by an external processor, and using the sub-images as current-level result images;

S2: extracting current-level image elements in the current-level result images according to a specified convolution kernel and the segmentation mode of the above sub-images;

S3: sending the current-level image elements to a front-level arithmetic unit, and receiving a back-level image elements sent by a back-level arithmetic unit;

S4: synthesizing the current-level result images and the back-level image elements into current-level images to be processed;

S5: performing convolution operation on said current-level images to be processed to obtain the current-level result images;

S6: when the above current-level result images reach a preset standard, ending the execution process of the image processing method; otherwise, iteratively executing the execution process of the image processing method.

When the image processing task starts, the processing step S1 is first executed, including:

S11: extracting, by an external processor, an original image from an external memory;

S12: performing lossless segmentation, by the external processor, on the original image to obtain sub-images arranged in sequence; and S13: sending, by the external processor, the sequentially arranged sub-images to the corresponding arithmetic unit in the arithmetic module.

Wherein the external memory 300 stores an image to be processed, and the image has a regular geometric boundary, and can be either a square image or a rectangular image.

As one case, as shown in FIG. 3(a), the external processor 200 divides the original image into n sub-images on average in a direction parallel to the width edge of the original image.

Figures 3B, 4, 5A:
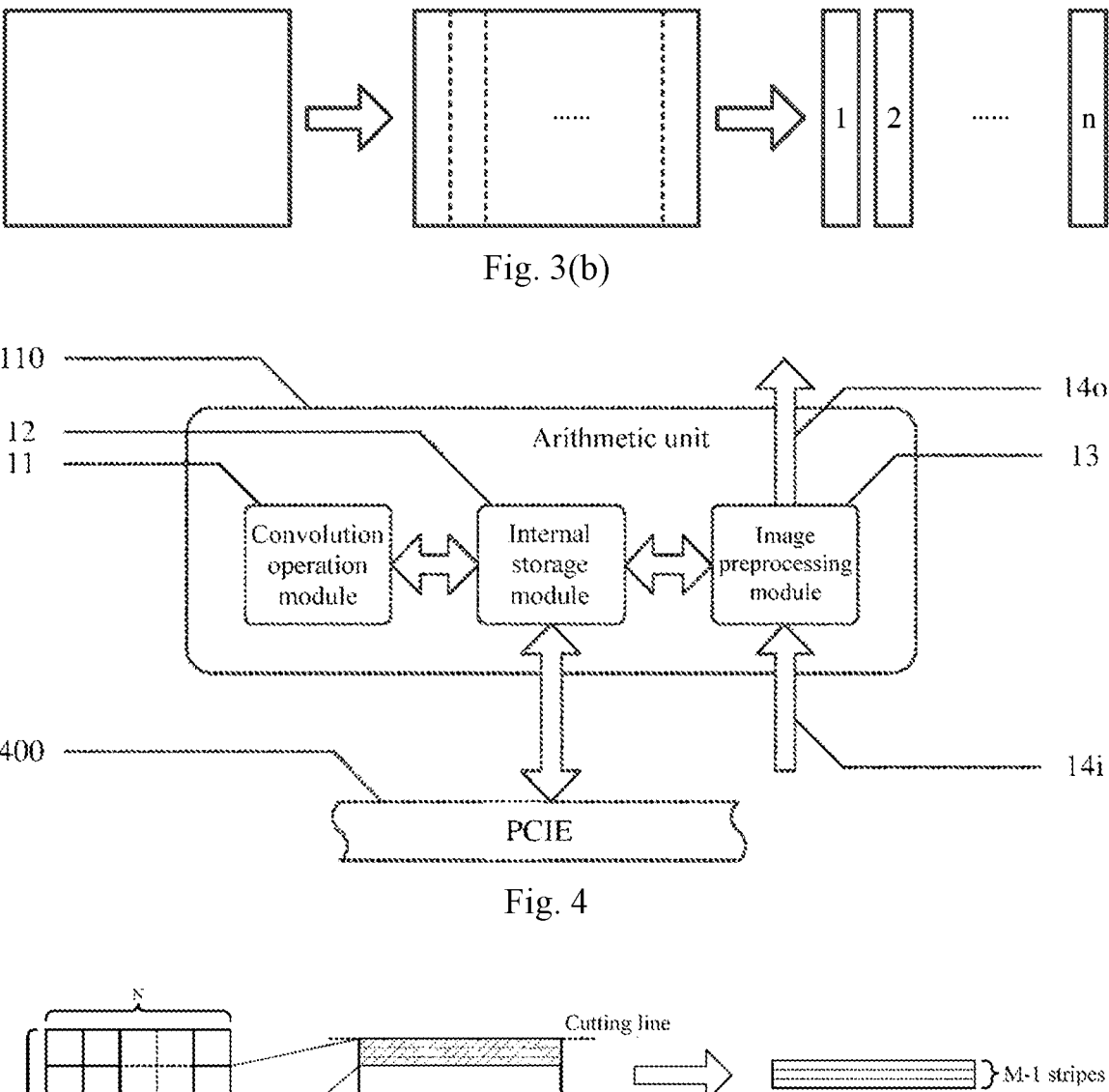
FIG. 4 is a schematic diagram of an internal functional module of a single arithmetic unit provided according to one or more embodiments of the present application.

As another case, as shown in FIG. 3(b), the external processor 200 divides the original image into n sub-images on average in a direction parallel to the height edge of the original image.

It should be noted that the above segmentation is lossless segmentation, that is, the sum of data amount of sub-images has no loss relative to the data amount of the original image; average segmentation means that average segmentation can be carried out according to the size of the original image area or according to the size of the data amount of the original image.

The original image is divided into n sub-images, wherein $n \geq N_{min}$, $N_{min}$ means the least number of required arithmetic units. $N_{min}$ is calculated by the formula:

$$N_{min} = \left[\frac{C}{m}\right] + 1$$

Where C represents the data size of the original image file, and m represents the capacity of the internal memory module of each arithmetic unit. The smallest unit for segmentation is a pixel point, that is, the width or height of a sub-image is an integer multiple rather than a fractional multiple of the width or height of a single pixel point.

In the case in which the number of pixel points on the width edge or the height edge of the original image cannot be divisible by n, the width edge or the height edge of the sub-image of the first order or the sub-image of the last order is adjusted to ensure that the sub-images of other orders are averagely segmented, and the data amount of each sub-image is less than the internal memory capacity m of the corresponding arithmetic unit.

The external processor 200 sequentially sends the sub-images to the corresponding arithmetic unit in the arithmetic module 100 through the bus 400, and the arithmetic unit takes the received sub-images as the current-level result images and stores in the internal storage module.

The internal functional modules of each arithmetic unit in the arithmetic module 100 are as shown in FIG. 4, and the internal functional module of a single arithmetic unit 110 includes:

a convolution arithmetic module 11, configured to perform convolution operation on the current-level images to be processed stored in the internal storage module 12;

an internal storage module 12, configured to store the current-level images to be processed and the current-level result images;

an image preprocessing module 13, configured to extract current-level image elements from the current-level result images, and send to the front-level image preprocessing module through the serial transceiver, and synthesize the back-level image elements received by the serial transceiver with the current-level result images in the current-level internal storage module to generate the current-level images to be processed, and store the current-level images to be processed into the current-level internal storage module;

the arithmetic unit 110 is cascaded with the back-level arithmetic unit through the serial transceiver 14i to receive image elements sent by the back-level arithmetic unit; the arithmetic unit 110 is cascaded with the front-level arithmetic unit through the serial transceiver 140 to send current-level image elements to the front-level arithmetic unit.

With the structure of the arithmetic module 100 shown in FIG. 1 as an example, the process of extracting current-level image elements in the current-level result images according to a specified convolution kernel and the segmentation mode of the above sub-images in step S2 is described, wherein the dimension of the convolution kernel can be 3×3, 5×5, . . . , as a common situation, the dimension of the convolution kernel can be represented as N×M.

Figures 5B, 6A:
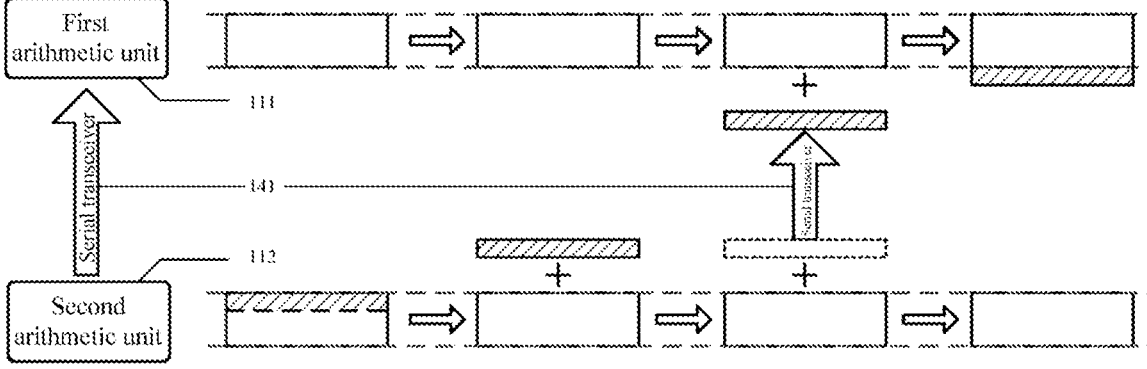
FIG. 5(*a*) is a schematic diagram of extracting current-level image elements according to sub-images segmented according to a convolution kernel and a horizontal manner provided according to one or more embodiments of the present application.
FIG. 6(*a*) is a schematic diagram of a process of synthesizing a next-stage image element from a horizontally segmented current-level result image provided according to one or more embodiments of the present application.

As shown in FIG. 5(*a*), the dimension of the convolution kernel is N×M, and the sub-images are obtained through horizontal segmentation in a direction parallel to the width edge of the original image. When the second arithmetic unit 112 extracts current-level image elements in the current-level result images, the second arithmetic unit 112 takes M–1 stripes of pixels adjacent to a cutting line for copying, to obtain current-level image elements. As shown in FIG. 5(*b*), for the case in which the dimension of the convolution kernel is N×M, and the sub-image is vertically segmented in a direction parallel to the height edge of the original image, when the second arithmetic unit 112 extracts the current-level image elements in the current-level result images, the second arithmetic unit 112 takes N–1 stripes of pixels adjacent to the cutting line for copying, to obtain current-level image elements.

S3: sending the current-level image elements to the front-level arithmetic unit, and receiving the back-level image elements sent by the back-level arithmetic unit, wherein the image elements are transmitted by the serial transceiver 141 between the first arithmetic unit 111 and the second arithmetic unit 112 which are cascaded in series.

S4: synthesizing the above current-level result images with the back-level image elements into current-level images to be processed.

Figure 6B:
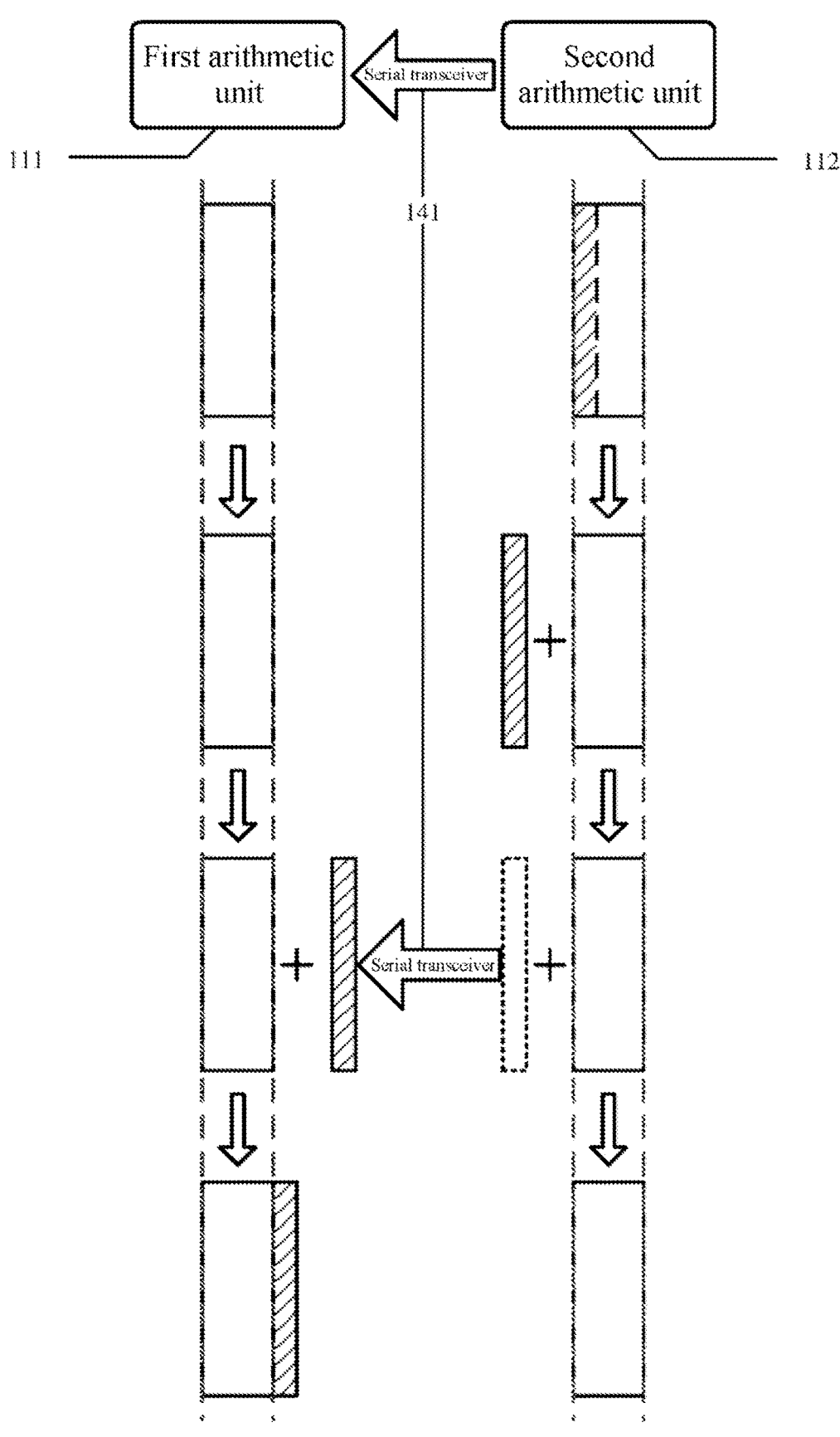

For different segmentation manners of the original image, S2-S4 can be represented by FIG. 6(*a*) and FIG. 6(*b*).

As shown in FIG. 6(*a*), if the external processor 200 divides the original image in a manner of horizontal segmentation, then, when the arithmetic unit extracts the current-level image elements, the arithmetic unit copies an image with the height of M–1 stripes of pixels at the boundary of the current-level result image adjacent to the front-level result image and sends to the front-level arithmetic unit through the serial transceiver 141, and the arithmetic unit receives the back-level image elements sent by the back-level arithmetic unit, and synthesizes the back-level image elements into the current-level result images at a boundary between the current-level result images and the back-level sub-images.

As shown in FIG. 6(*b*), if the external processor 200 divides the original image in a manner of vertical segmentation, then, when the arithmetic unit extracts the current-level image elements, the arithmetic unit copies an image with a width of N–1 stripes of pixels at the boundary of the current-level result image adjacent to the front-level result image and sends to the front-level arithmetic unit through the serial transceiver 141, and the arithmetic unit receives the back-level image elements sent by the back-level arithmetic unit, and synthesizes the back-level image elements into the current-level result images at a boundary between the current-level result images and the back-level sub-images.

Complementary processing of the front-level image can eliminate noise at the boundary of the image and achieve an effect that image processing quality is not affected by the image segmentation method.

The synthesized image is taken as the current-level image to be processed and is stored in the internal storage module 12.

S5: performing convolution operation on the above current-level images to be processed, to obtain the current-level result images;

when convolution operation is performed on the current-level images to be processed, firstly a convolution kernel is selected according to an image processing task. Usually, the dimension of the convolution kernel on one channel is 3×3.

However, an original image is formed when pixels of red (R), green (G), and blue (B) channels are superimposed, and the convolution kernel will be trained on the red, green, and blue channels, to obtain a proper convolution kernel.

Figures 7, 8, 9:
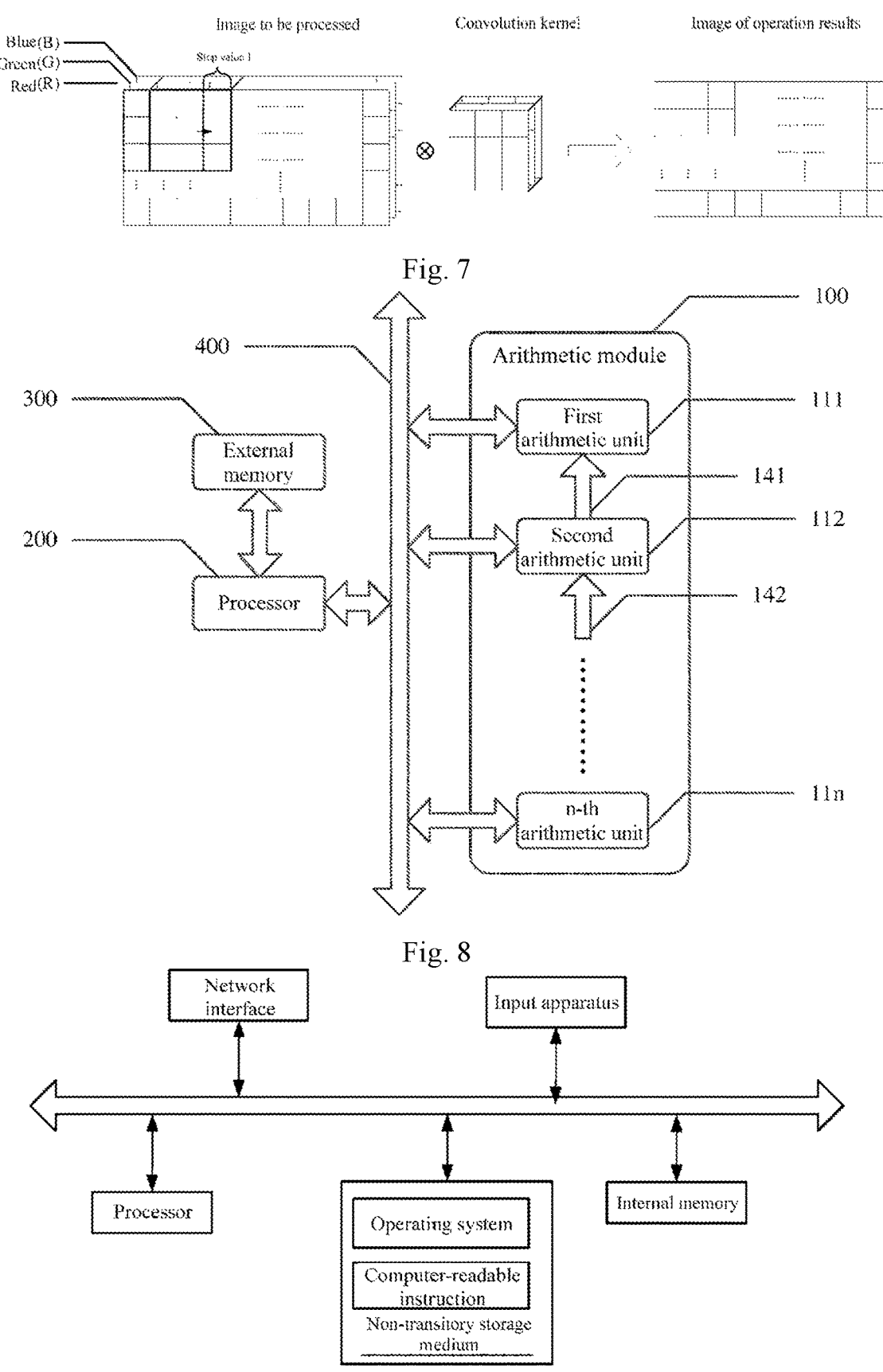
FIG. 7 is a schematic diagram of convolution operation provided according to one or more embodiments of the present application.
FIG. 8 is a schematic diagram of an extended arithmetic module provided according to one or more embodiments of the present application.
FIG. 9 is a structural schematic diagram of an image processing electronic device provided according to one or more embodiments of the present application.

As shown in FIG. 7, a convolution kernel obtained from training is used, the step value is set to 1 (indicating that the convolution kernel moves by the width or height of a pixel on the image each time), and convolution operation is performed on the image to be processed, to obtain current-level result images and store in the internal storage module.

During image processing of the arithmetic unit, no external memory is needed, thereby effectively avoiding reading and writing of data between the arithmetic unit and the external memory, avoiding the impact of a memory wall effect on the image processing performance, and achieving an effect of dramatically improving the image processing performance.

S6: When the above current-level result images reach the preset standard, ending the execution process of the image processing method; otherwise, iteratively performing the execution process of the image processing method, wherein after the current-level result images reach the preset standard, the arithmetic module 100 sends the sub-images processed by each arithmetic unit to the external processor 200.

Finally, the external processor 200 sequentially splices the result images sent back by each arithmetic unit, to synthesize final result images. This splicing process is just an inverse process of the aforementioned segmentation process in S1.

In another embodiment, images with a large amount of data are processed. As shown in FIG. 8, the basic architecture of the arithmetic module 100 remains unchanged, and the arithmetic units in the arithmetic module 100 need to be extended to adapt to corresponding image processing tasks. The number n of arithmetic units required in the arithmetic module 100 has been introduced above and will not be repeated redundantly herein. The extended arithmetic unit (the n-th arithmetic unit 11*n*) needs to establish communication connection with the bus 400. At the same time, the extended arithmetic unit needs to be serially cascaded with the front-level arithmetic unit through the serial transceiver 142. The working processes of each arithmetic unit, the arithmetic module 100, the processor 200, the external memory 300, and bus 400 are the same as those described above, and will not be repeated redundantly herein.

Images with a large amount of data can be processed through extending the number of arithmetic units in the arithmetic module. The arithmetic units of the original model are stilled adopted, with no need of replacing with arithmetic units of high performance and high price.

For the extended arithmetic module, each arithmetic unit still uses the image processing method disclosed in the present application, such that the arithmetic unit can perform parallel processing on images with a large amount of data, and adopts multiple arithmetic units for parallel calculation, and the serial cascaded hardware architecture can achieve an effect of compressing the image processing time and improving the overall processing performance of images.

When the use of high-performance arithmetic units is subject to objective constraints, multiple low-performance arithmetic units can be used to replace one high-performance arithmetic unit, and effects that the calculating power is the same as or even higher than the calculating power of a single high-performance arithmetic unit and simultaneously the cost is greatly reduced can be achieved.

The technical solutions provided by embodiments of the present application bring the following beneficial effects:

1. When the image processing method disclosed in the present application is adopted, the original image is segmented into sub-images without loss. In the image processing process, the data amount of the image processed by a single arithmetic unit is reduced, no external memory needs to be used, thereby effectively avoiding reading and writing of data between the arithmetic unit and the external memory, avoiding the influence of the memory wall effect on the image processing performance, and achieving an effect of dramatically improving the image processing performance.

2. When the data amount of images increases, only the number of arithmetic units in the arithmetic module needs to be extended, and the image processing task can be performed in parallel only through adopting arithmetic units of the original model, with no need of replacing with arithmetic modules of high performance and high price, thereby ensuring the image processing performance and reducing the cost of hardware.

All of the above optional technical solutions may be combined in any way to form an optional embodiment of the present application, and will not be repeated redundantly herein.

Embodiment 1

In the present embodiment, each arithmetic unit in the arithmetic module 100 uses the FPGA, the external processor 200 uses the CPU, the external memory 300 uses the DDR, the bus 400 uses the PCIE bus, the serial transceiver 141 selects a GT high-speed serial transceiver, the convolution kernel of a single channel is 3×3, the number of channels corresponds to the number of original image channels; and images are processed by adopting horizontal dichotomy of original images.

When the image processing task starts, the CPU reads a rectangular original image from the DDR and segments the original image along a horizontal cutting line parallel to the width edge, to obtain sub-images of the same area. The sub-images are respectively sent to the corresponding FPGA1 arithmetic unit and FPGA2 arithmetic unit via the PCIE bus and stored in the internal memory modules of each arithmetic unit. Wherein FPGA1 corresponds to a front-level arithmetic unit, and FPGA2 corresponds to a back-level arithmetic unit. The sub-images stored in the internal memory module are taken as the current-level result images of each FPGA and are further processed by two arithmetic units respectively.

In the present embodiment, the dimension of the convolution kernel is 3×3, and the number of channels of the convolution kernel is consistent with the number of channels of each sub-image.

The back-level FPGA2 arithmetic unit copies two rows of pixel images adjacent to a cutting line from the image cutting line as image elements and sends the above image elements to the front-level FPGA1 through the GT high-speed serial transceiver. After receiving the above image elements, the front-level FPGA1 supplements the above image elements to the current-level result images along the cutting line to generate the current-level images to be processed. The current-level result images of the back-level FPGA are the current-level images to be processed of the back-level FPGA.

At this time, the front-level FPGA1 and the back-level FPGA2 perform parallel convolution operation on their respective images to be processed, to respectively obtain respective current-level result images.

The above process is performed repeatedly, until the result images meet the preset requirements.

Afterwards, FPGA1 and FPGA2 respectively transmit their respective current-level result images to a CPU through a PCIE bus, and the CPU synthesizes the final result images and stores in the external DDR to complete the image processing task.

Embodiment 2

In order to process high-definition images with a large amount of data, the present embodiment provides a case in which the hardware device of an arithmetic unit is expanded according to the arithmetic module architecture as shown in FIG. 1, the number of arithmetic units is n, and the calculation method of n is obtained by the aforementioned formula. In the present embodiment, each arithmetic unit in the arithmetic module 100 uses a GPU, the external processor 200 uses a CPU, the external memory 300 uses a DDR, the bus 400 uses a PCIE bus, the serial transceiver 141, the serial transceiver 142, etc., and a GT high-speed serial transceiver is selected, the convolution kernel of a single channel is 3×3, and the number of channels corresponds to the number of channels of the original image; and the original image is segmented into n parts through a processing method of vertical segmentation.

When the image processing task starts, the CPU reads a rectangular original image from the DDR, and segments the original image along the vertical cutting line parallel to a width edge, to obtain sub-images of the same area. The sub-images are respectively sent to corresponding GPUs via the PCIE bus and stored in a video memory of GPU. Wherein the front-level and back-level relationship of the GPU can be defined by a data transmission direction: as to the two GPUs which are cascaded in series, the GPU receiving image elements is a front-level GPU, and the GPU sending the image element is a back-level GPU. The sub-images stored in the video memory are taken as current-level result images of each GPU and are further processed by each GPU.

In the present embodiment, the dimension of the convolution kernel is N×M, and the number of channels of the convolution kernel is consistent with the number of channels of each sub-image.

Subsequently, the current-level GPU processes the current-level result images stored in the video memory, and the back-level GPU copies the N−1 columns of pixel images adjacent to the cutting line from the image cutting line as image elements, and sends the above image elements to the front-level GPU through the serial transceiver, and after the front-level GPU receives the above image elements, the front-level GPU supplements the above image elements to the current-level result images along the cutting line to generate the current-level images to be processed. The current-level result images of the back-level GPU are just the current-level images to be processed of the back-level GPU.

At this time, each GPU performs convolution operation on the current-level images to be processed to obtain result images and stores the result images in a video memory. The process of copying image elements, synthesizing the images to be processed, performing convolution operation to obtain result images is repeated, until the above result images conform to preset requirements.

Afterwards, each GPU respectively transmits its own current-level result image to the CPU through the PCIE bus, and the CPU synthesizes the final result image and stores in DDR to complete the image processing task.

In particular, according to embodiments of the present application, the process described above with reference to the flowcharts can be implemented as a computer software program. For example, the embodiments of the present application include a computer program product, and the computer program product includes a computer program loaded on a computer-readable medium, and the computer program includes program codes for executing the method shown in the flowchart. In such an embodiment, the computer program may be downloaded and installed from a network through the communication device, or installed from a memory, or installed from an ROM. When the computer program is executed by an external processor, the above functions defined in the embodiments of the present application are executed.

It should be noted that the computer-readable medium in the embodiments of the present application may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or any combination thereof. More specific examples of the computer-readable storage media may include, but are not limited to, electrical connections with one or more wires, portable computer diskettes, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any combination of the above. In the embodiments of the present application, a computer-readable storage medium may be any tangible medium containing or storing a program, and the program may be used by or used in combination with an instruction execution system, apparatus, or device. However, in the embodiments of the present application, the computer-readable signal medium may include data signals propagated in a baseband or as part of a carrier wave, wherein computer-readable program codes are carried therein. Such propagated data signals may take a variety of forms, including but not limited to electromagnetic signals, optical signals, or any combination of the above. A computer readable signal medium may also be any computer readable medium other than a computer readable storage medium, and the computer readable storage medium can transmit, propagate, or transport a program used by or used in connection with an instruction execution system, apparatus, or device. The program code contained on the computer readable medium can be transmitted by any appropriate medium, including but not limited to: electric wires, optical cables, RFs (Radio Frequency), etc., or any proper combination of the above.

The above computer-readable medium may be included in the above server, or may exist independently without being assembled into the server. The above computer-readable medium carries one or more programs, and when the one or more programs are executed by the server, the server acquires a frame rate used on a terminal in response to detecting that a peripheral mode of the terminal is not activated; judges whether a user is obtaining screen information of the terminal when the frame rate satisfies screen conditions; and controls the screen to enter into an intermediate dim mode in response to the judgment result that the user has not acquired the screen information of the terminal.

Computer program codes for performing operations of the embodiments of the present application may be written in one or more programming languages or a combination thereof, and the programming languages include object-oriented programming languages such as Java, Smalltalk, C++, and further include conventional procedural programming language, such as "C" language or similar programming languages. The program codes may be executed entirely on a computer of the user, executed partly on a computer of the user, executed as a stand-alone software package, executed partly on a computer of the user and partly on a remote computer, or executed entirely on a remote computer or a server. In cases involving a remote computer, the remote computer may be connected to the user computer through any kind of network, including a local area network (LAN) or a wide area network (WAN), or may be connected to an external computer (such as connecting through an internet by utilizing an Internet service provider).

In one embodiment, an image processing electronic device is provided. The image processing electronic device may include a computer device, and the computer device may be a terminal or a server. The internal structure diagram of the image processing electronic device may be shown in FIG. 9. The image processing electronic device includes a processor, a memory, a network interface and an input device connected through a system bus. Wherein, the processor is configured to provide calculation and control capabilities. The memory includes a non-transitory storage medium and an internal memory. The non-transitory storage medium has an operating system and computer readable instructions stored therein. The internal memory provides an environment for the operation of an operating system and computer readable instructions in the non-transitory storage medium. The network interface of the computer device is configured to communicate with an external terminal or server through network connection. The computer readable instructions implement an image processing method when being executed by a processor. The input apparatus may be a touch layer covered on the display screen, or a button, a trackball or a touch pad arranged on a housing of the computer device, or an external keyboard, touch pad or mouse.

Those skilled in the art can understand that the structure shown in FIG. 9 is only a block diagram of part of the structures related to the solution of the present application, and does not constitute a limitation on the devices to which the solution of the present application is applied. Specific devices may include more or fewer components than those shown in the figures, or combine certain components, or have different component arrangements.

Embodiments of the present application further provide a non-transitory readable storage medium, the non-transitory readable storage medium has computer-readable instructions stored therein, and the computer-readable instruction computer program, when being executed by one or more processors, may implement steps of the image processing method mentioned in any of the above embodiments.

Each embodiment in the present specification is described in a progressive manner, and the same and similar parts of each embodiment can be referred to each other, and each embodiment focuses on the differences from other embodiments. In particular, for systems or system embodiments, since they are basically similar to the method embodiments, the description is relatively simple, and for relevant parts, please refer to the description of the method embodiments. The systems and system embodiments described above are merely illustrative, and the units described as separate components may or may not be physically separated, and the components shown as units may or may not be physical units, that is, they can be located in one place, or they can be distributed to multiple network units. Part or all of the modules can be selected according to actual requirements to achieve the purpose of the solution of the present embodiment. Those skilled in the art can understand and implement without any creative effort.

Those skilled in the art can understand that all or part of the flow in the method of the above embodiments can be finished when computer-readable instructions instruct related hardware, the computer-readable instructions can be stored in a non-transitory computer-readable storage medium, and when being executed, the computer-readable instruction can include the flow of each above method embodiment. Wherein, any references to the memory, storage, database or other media used in various embodiments provided in the present application may include non-transitory and/or transitory memories. Non-transitory memories can include a read-only memory (ROM), a programmable ROM (PROM), an electrically programmable ROM (EPROM), an electrically erasable programmable ROM (EEPROM), or a flash memory. Transitory memories can include a random access memory (RAM) or an external cache memory. As an illustration rather than limitation, RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SL-DRAM), a memory bus (Rambus) direct RAM (RDRAM), a direct memory bus dynamic RAM (DRDRAM), and a memory bus dynamic RAM (RDRAM), etc.

Technical features of the above embodiments can be combined arbitrarily. To make the description concise, not all the possible combinations of the technical features in the above embodiments are described. However, as long as the combinations of these technical features do not conflict with each other, all the combinations shall be considered to fall within the scope described in this specification.

The above embodiments merely illustrate several embodiments of the present application, the description is more specific and detailed but is not therefore to be construed as limiting the scope of the invention patent. It should be noted that for those skilled in the art, various modifications and improvements may be made under a premise of not departing from the concept of the present application, and such modifications and improvements shall all fall within the protection scope of the present application. Therefore, the protection scope of the patent application shall be subject to the attached claims.

The invention claimed is:

1. An image processing method, applied to an arithmetic unit in an image processing apparatus, wherein the image processing apparatus comprises at least a first arithmetic unit and a second arithmetic unit, the first arithmetic unit and the second arithmetic unit are cascaded by means of a serial transceiver, and among at least the first arithmetic unit and the second arithmetic unit, an arithmetic unit that receives data through the serial transceiver is a front-level arithmetic unit and an arithmetic unit that sends data through the serial transceiver is a back-level arithmetic unit, the first arithmetic unit and the second arithmetic unit are configured to execute the image processing method in parallel, and the image processing method comprises:

acquiring sub-images obtained by segmenting an original image by an external processor, and using the sub-images as current-level result images;

extracting current-level image elements in the current-level result images according to a specified convolution kernel and a segmentation mode in which the sub-images are obtained;

sending the current-level image elements to the front-level arithmetic unit, and receiving back-level image elements sent by the back-level arithmetic unit;

synthesizing the current-level result images and the back-level image elements into current-level images to be processed;

performing convolution operation on said current-level images to be processed to obtain the current-level result images;

when the obtained current-level result images reach a preset standard, the execution process of the image processing method ends; and when the obtained current-level result images fail to reach the preset standard, the execution process of the image processing method is executed iteratively.

2. The image processing method of claim 1, wherein the step of acquiring sub-images obtained by segmenting an original image by an external processor comprises:

segmenting the original image horizontally in a direction parallel to a width edge of the original image, to obtain the sub-images;

or, segmenting the original image vertically in a direction parallel to a height edge of the original image, to obtain the sub-images.

3. The image processing method of claim 1, wherein the convolution kernel has a width N and a height M;

the width N is a positive odd number;

the height M is a positive odd number;

the number of channels of the convolution kernel is the same as the number of channels of the current-level images to be processed; and parameters of the convolution kernel are obtained by pre-training.

4. The image processing method of claim 3, wherein the step of extracting current-level image elements in the current-level result images according to a specified convolution kernel and a segmentation mode in which the sub-images are obtained comprises:

when the original image is segmented horizontally in a direction parallel to the width edge of the original image, copying M−1 stripes of pixels, adjacent to a boundary of each front-level result image, from the current-level result images as the current-level image elements; and when the original image is segmented vertically in a direction parallel to the height edge of the original image, copying N−1 stripes of pixels, adjacent to a boundary of each front-level result image, from the current-level result images as the current-level image elements.

5. The image processing method of claim 1, wherein the step of synthesizing the current-level result images and the back-level image elements into current-level images to be processed comprises:

splicing the back-level image elements in sequence to a boundary connected with each current-level result image; and taking the spliced images as the current-level images to be processed.

6. The image processing method of claim 1, wherein the step of performing convolution operation on said current-level images to be processed comprises:

setting a uniform step value for a complete convolution operation; and starting the process of convolution operation.

7. An image processing apparatus, comprising:

at least a first arithmetic unit and a second arithmetic unit;

wherein both the first arithmetic unit and the second arithmetic unit are configured to execute the image processing method of claim 1 in parallel;

the first arithmetic unit and the second arithmetic unit are cascaded by means of a serial transceiver;

as a front-level arithmetic unit, the first arithmetic unit is configured to receive image elements;

as a back-level arithmetic unit, the second arithmetic unit is configured to send image elements; and the serial transceiver is configured to take the image elements of the back-level arithmetic unit as back-level image elements and send the back-level image elements to the front-level arithmetic unit.

8. An image processing electronic device, comprising a memory and one or more processors, the memory has computer readable instructions stored therein, and the computer readable instructions, when executed by the one or more processors, enable the one or more processors to perform steps of the image processing method of claim 1.

9. The image processing method according to claim 1, wherein, in response to that the current-level result images reach a preset standard, the arithmetic unit in the image processing apparatus sends the current-level result images to the external processor, and the execution process of the image processing method is ended.

10. The image processing method according to claim 1, wherein, in response to that the current-level result images fail to reach a preset standard, the arithmetic unit of the image processing apparatus does not send the current-level result images to the external processor.

11. The image processing method according to claim 6, wherein, a step value of the convolution kernel is set to 1.

12. The image processing method according to claim 1, wherein, the step of acquiring sub-images obtained by segmenting an original image by an external processor and using the sub-images as current-level result images comprises:

extracting, by the external processor, an original image from an external memory;

performing lossless segmentation, by the external processor, on the original image to obtain sub-images arranged in sequence; and sending, by the external processor, the sequentially arranged sub-images to the corresponding arithmetic unit.

13. The image processing method according to claim 1, wherein, in a case that the number of pixel points on a width edge or a height edge of the original image is not divisible by the number of the sub-images, the width edge or the height edge of a sub-image of the first order or a sub-image of the last order is adjusted to ensure that sub-images of other orders are uniformly segmented, and the data amount of each sub-image is less than an internal memory capacity of the corresponding arithmetic unit.

14. The image processing method according to claim 9, wherein, the external processor sequentially splices the result images sent back by each arithmetic unit, to synthesize a final result image.

15. The image processing method according to claim 14, wherein, the process of synthesizing a final result image is an inverse process of the process of obtaining sub-images by segmenting an original image.

16. The image processing method according to claim 13, wherein, the sub-images of other orders are uniformly segmented according to:

the size of area of the original image, or the size of data amount of the original image.

17. The image processing apparatus according to claim 7, wherein, when the image processing method is executed by the first arithmetic unit and the second arithmetic unit in parallel, in response to that current-level result images of the first arithmetic unit or the second arithmetic unit fail to meet a preset standard, the first arithmetic unit or the second arithmetic unit executes the image processing method iteratively; in response to that the current-level result images of the first arithmetic unit or the second arithmetic unit meet the preset standard, the first arithmetic unit or the second arithmetic unit ends the image processing method.

18. The image processing apparatus according to claim 7, wherein, when the image processing method is executed by the first arithmetic unit and the second arithmetic unit in parallel, the step of acquiring sub-images obtained by segmenting an original image by an external processor and using the sub-images as current-level result images comprises:

extracting, by the external processor, an original image from an external memory;

performing lossless segmentation, by the external processor, on the original image to obtain sub-images arranged in sequence; and sending, by the external processor, the sequentially arranged sub-images to the first arithmetic unit or the second arithmetic unit.

19. The image processing electronic device according to claim 8, wherein, the steps of the image processing method executed by the one or more processors further comprise:

when the current-level result images reach a preset standard, the execution process of the image processing method ends; and when the current-level result images fail to reach the preset standard, the execution process of the image processing method is executed iteratively.

*    *    *    *    *